United States Patent
Nakamura et al.

(10) Patent No.: US 6,879,704 B2
(45) Date of Patent: *Apr. 12, 2005

(54) IMAGE PROCESSING APPARATUS, IMAGE PROCESSING METHOD AND RECORDING MEDIUM

(75) Inventors: Yasufumi Nakamura, Kawasaki (JP); Yasuhiro Kawakatsu, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,118

(22) Filed: Jul. 8, 1999

(65) Prior Publication Data

US 2003/0099396 A1 May 29, 2003

(30) Foreign Application Priority Data

Jul. 10, 1998 (JP) ............................................ 10-196015

(51) Int. Cl.$^7$ ................................................. G06K 9/00
(52) U.S. Cl. ........................ 382/103; 348/169; 345/622
(58) Field of Search ................................. 382/177, 173, 382/178, 179, 103; 348/169, 621, 622; 342/135, 596; 345/622

(56) References Cited

U.S. PATENT DOCUMENTS

| | | | | |
|---|---|---|---|---|
| 4,396,903 A | * | 8/1983 | Habicht et al. ................ 342/64 |
| 5,384,864 A | * | 1/1995 | Spitz ........................... 382/174 |
| 5,444,797 A | * | 8/1995 | Spitz et al. ................... 382/177 |
| 5,459,529 A | * | 10/1995 | Searby et al. ................. 348/584 |
| 5,555,556 A | * | 9/1996 | Ozaki .......................... 235/375 |
| 5,737,011 A | * | 4/1998 | Lukacs ..................... 348/14.09 |
| 5,870,138 A | * | 2/1999 | Smith et al. ................. 348/143 |
| 5,907,631 A | * | 5/1999 | Saitoh ......................... 382/176 |
| 5,974,175 A | * | 10/1999 | Suzuki ........................ 382/199 |
| 5,999,161 A | * | 12/1999 | Kajimoto et al. ............. 345/24 |
| 6,061,055 A | * | 5/2000 | Marks ......................... 345/972 |
| 6,115,495 A | * | 9/2000 | Tachikawa et al. .......... 382/165 |
| 6,124,896 A | * | 9/2000 | Kurashige ................... 348/584 |

FOREIGN PATENT DOCUMENTS

| | | |
|---|---|---|
| GB | 2 002 989 | 2/1979 |
| GB | 2 013 448 | 8/1979 |
| GB | 2 322 992 | 9/1998 |
| JP | 5-225383 | 9/1993 |
| JP | 5-225384 | 9/1993 |
| JP | 7-28933 | 1/1995 |

* cited by examiner

*Primary Examiner*—Samir Ahmed
*Assistant Examiner*—Anand Bhatnagar
(74) *Attorney, Agent, or Firm*—Staas & Halsey LLP

(57) ABSTRACT

An image processing apparatus for extracting a desired target object from an image which includes the target object, includes a target object identification part identifying the target object from the image, a rectangle extracting part extracting a rectangle which includes the target object identified by said target object identification part, and an image cutting part cutting out a rectangular image including the target object from the rectangle extracted from the image by said rectangle extracting part.

19 Claims, 13 Drawing Sheets

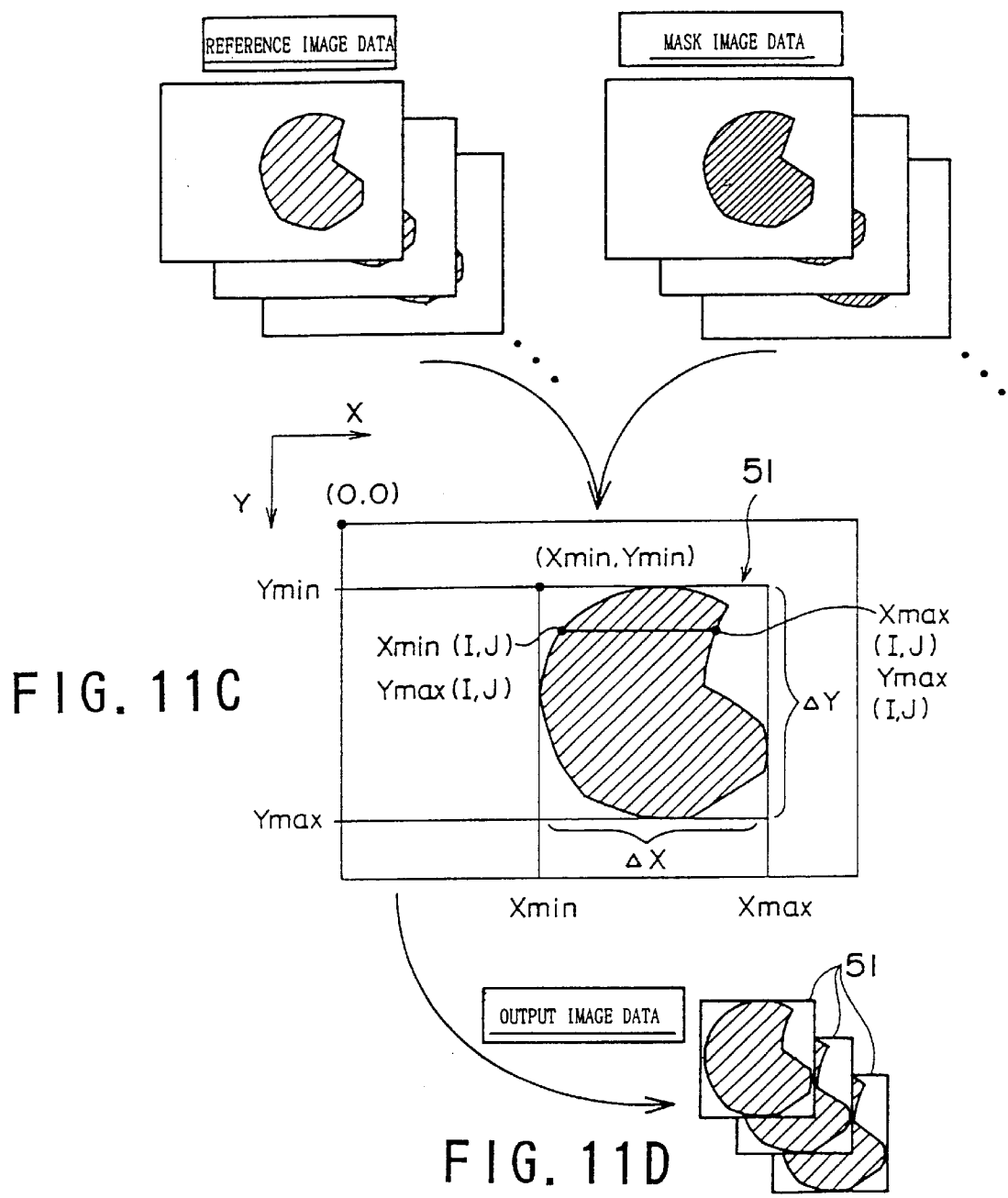

IMAGE PROCESSING APPARATUS, IMAGE PROCESSING METHOD AND RECORDING MEDIUM

DETAILED DESCRIPTION OF THE INVENTION

1. Field of the Invention

The present invention generally relates to image processing apparatuses, image processing methods and recording mediums, and more particularly to an image processing apparatus and an image processing method which extract a desired target object from an image and to a computer-readable recording medium which causes a computer to make such a target object extraction.

2. Description of the Related Art

Conventionally, when cutting out a desired target object from a motion picture, an image of the desired target object is picked up, in general, using a blue background. The blue background is eliminated using the chroma key extraction technique, and the target object to be used is cut out. Another background is used in place of the eliminated blue background, and the cut out target object and this other background are composed.

However, according to the image processing method described above, although the cut out image is a part of a reference image, the size of the cut out image is the same as the size of the reference image. For this reason, there is a problem in that the efficiency of the data which are processed is poor.

In other words, since the background of the cut out image is composed later, data related to parts other than the cut out image are surplus data. But when the data are stored, unwanted data portions related to the blue background amount to a large portion of the stored data.

SUMMARY OF THE INVENTION

Accordingly, it is a general object of the present invention to provide a novel and useful image processing apparatus, image processing method and recording medium, in which the problems described above are eliminated.

Another and more specific object of the present invention is to provide an image processing apparatus, an image processing method and a recording medium which can improve the data efficiency when processing an image.

Still another object of the present invention is to provide an image processing apparatus for extracting a desired target object from an image which includes the target object, comprising a target object identification part identifying the target object from the image, a rectangle extracting part extracting a rectangle which includes the target object identified by said target object identification part, and an image cutting part cutting out a rectangular image including the target object from the rectangle extracted from the image by said rectangle extracting part. According to the image processing apparatus of the present invention, the rectangle including the target image and not the entire picture is cut out, so that the target object can be cut out by processing a small amount of data. For this reason, it is possible to improve the data efficiency when processing the image data.

A further object of the present invention is to provide an image processing apparatus for extracting a desired target object from an image which includes the target object, comprising target object identification means for identifying the target object from the image, rectangle extracting means for extracting a rectangle which includes the target object identified by said target object identification means, and image cutting means for cutting out a rectangular image including the target object from the rectangle extracted from the image by said rectangle extracting means. According to the image processing apparatus of the present invention, the rectangle including the target image and not the entire picture is cut out, so that the target object can be cut out by processing a small amount of data. For this reason, it is possible to improve the data efficiency when processing the image data.

Another object of the present invention is to provide a computer-readable recording medium which stores a program for causing a computer to carry out a target object identification step for identifying a target object from an image which includes the target object, a rectangle extracting step for extracting a rectangle which includes the target object identified by said target object identification step, and an image cutting step for cutting out a rectangular image including the target object from the rectangle extracted from the image by said rectangle extracting step. According to the computer-readable recording medium of the present invention, the rectangle including the target image and not the entire picture is cut out, so that the target object can be cut out by processing a small amount of data. For this reason, it is possible to improve the data efficiency when processing the image data.

Still another object of the present invention is to provide an image processing method for extracting a desired target object from an image which includes the target object, comprising a target object identification step for identifying a target object from an image which includes the target object, a rectangle extracting step for extracting a rectangle which includes the target object identified by said target object identification step, and an image cutting step for cutting out a rectangular image including the target object from the rectangle extracted from the image by said rectangle extracting step. According to the image processing method of the present invention, the rectangle including the target image and not the entire picture is cut out, so that the target object can be cut out by processing a small amount of data. For this reason, it is possible to improve the data efficiency when processing the image data.

Other objects and further features of the present invention will be apparent from the following detailed description when read in conjunction with the accompanying drawings.

BRIEF DESCRIPTION OF THE DRAWINGS

FIGS. 11A, 11B, 11C and 11D respectively are diagrams for explaining an image processing operation of the embodiment;

DESCRIPTION OF THE PREFERRED EMBODIMENTS

Figure 1:
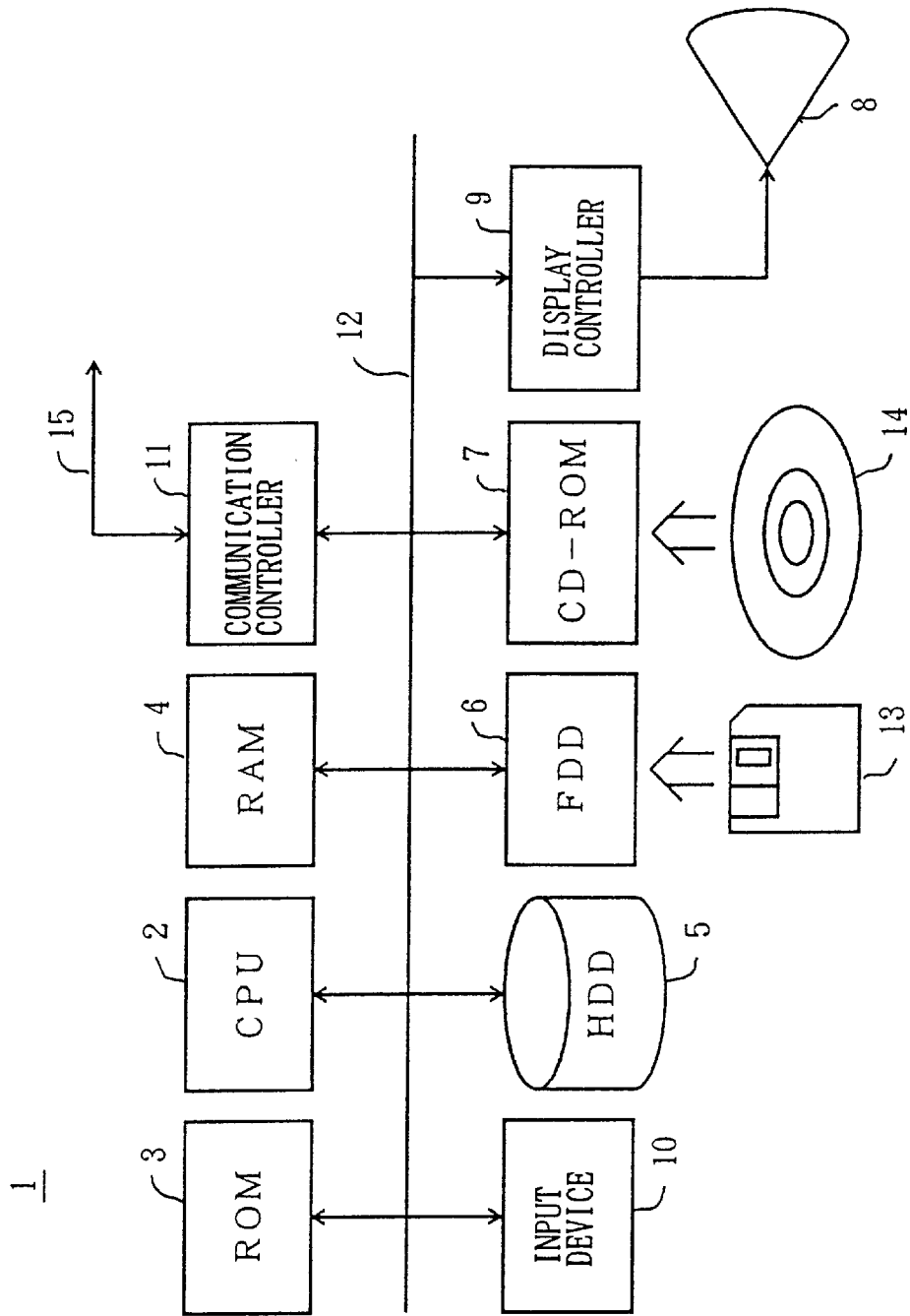
FIG. 1 is a system block diagram showing an embodiment of an image processing apparatus according to the present invention.

FIG. 1 is a system block diagram showing an embodiment of an image processing apparatus according to the present invention. This embodiment of the image processing apparatus employs an embodiment of an image processing method according to the present invention and an embodiment of a computer-readable recording medium according to the present invention.

In this embodiment, an information processing apparatus 1 generally includes a CPU 2, a ROM 3, a RAM 4, a hard disk drive 5, a floppy disk drive 6, a CD-ROM drive 7, a display 8, a display controller 9, an input device 10, a communication controller 11, and a bus 12.

The CPU 2 carries out a desired data processing depending on a program which is being executed. The ROM 3 stores a starting program, initial values and the like, and the starting program, the initial values and the like are read from the ROM 3 when starting the information processing apparatus 1. Application software programs and data are developed from the hard disk drive 6 and stored in the RAM 4, and this RAM 4 is used as a work region of the CPU 2.

The hard disk drive 5 stores an operating system (OS), an image processing program of this embodiment, reference image data, mask image data, processed image data and the like. The OS, programs and data stored in the hard disk drive 5 are developed in the RAM 4 and processed by the CPU 2.

The floppy disk drive 6 is loaded with a floppy disk 13, and stores programs and data on the floppy disk 13, and also reads programs and data which are prestored on the floppy disk 13.

The CD-ROM drive 7 is loaded with a CD-ROM 14, and reads programs and data stored on the CD-ROM 14.

The display 8 displays an image corresponding to display data. The display controller 9 is coupled between the display 8 and the bus 12, and converts the display data into an image signal which is suited for displaying the image on the display 8.

The input device 10 is formed by a keyboard, mouse and the like, and is used to input instructions and data to the information processing apparatus 1. The communication controller 11 is coupled to a communication line 15, and makes a communication via the communication line 15 so as to transmit and receive programs and data. The bus 12 is coupled to the CPU 2, the ROM 3, the RAM 4, the hard disk drive 5, the floppy disk drive 6, the CD-ROM drive 7, the display 8, the display controller 9, the input device 10 and the communication controller 11, and exchanges commands and data among these elements.

The image processing program which causes the CPU 2 to carry out an image processing of this embodiment is installed in the hard disk drive 5. This image processing program may be provided by the floppy disk 13 or the CD-ROM 14. In addition, this image processing program may be provided via the communication line 15. The floppy disk 13, the CD-ROM 14 or the like which stores the image processing program forms this embodiment of the recording medium according to the present invention.

Next, a description will be given of the operation of the image processing program of this embodiment.

Figure 2:
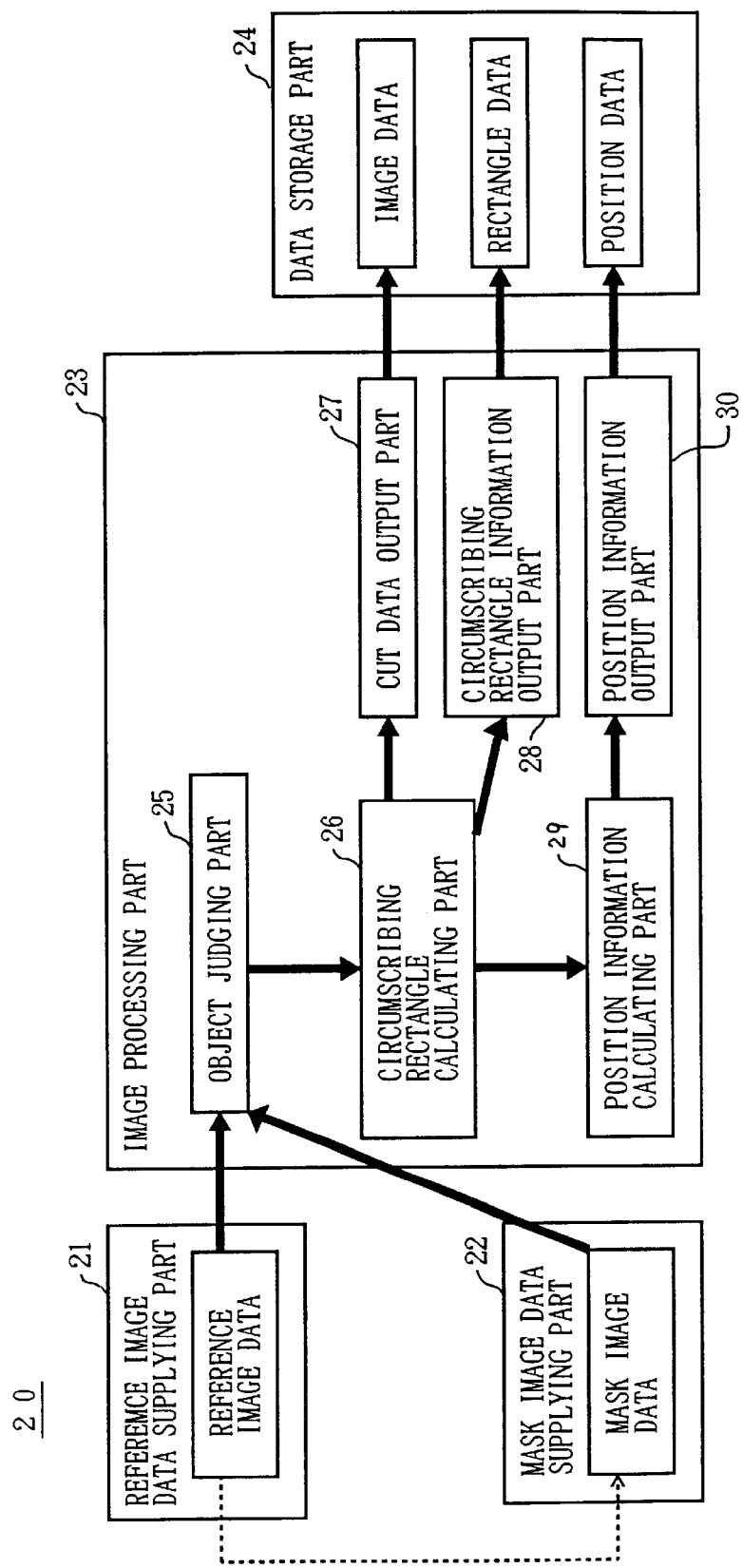
FIG. 2 is a functional block diagram showing the embodiment of the image processing apparatus according to the present invention.

FIG. 2 is a functional block diagram showing this embodiment of the image processing apparatus.

An image processing program 20 includes a reference image data supplying part 21, a mask image data supplying part 22, an image processing part 23, and a data storage part 24 for making the information processing apparatus (computer) 1 carry out the following functions.

The reference image data supplying part 21 supplies to the image processing part 23 a reference image data of a reference image including a target object which is to be cut out.

The mask image data supplying part 22 supplies to the image processing part 23 a mask image data for masking parts of the reference image other than the target object which is to be cut out. The mask image data supplied from the mask image data supplying part 22 is created based on the reference image data supplied from the reference image data supplying part 21.

The mask image data can be created from the reference image data by a manual method or an automatic method which makes an image extraction or the like.

For example, the manual method which creates the mask image data specifies a region which is to be excluded from the masking, by moving a pointer on the reference image while an operator manipulates a right button of the mouse which is used as the input device 10, with respect to each frame. After specifying the region, a predetermined operation is carried out to create the mask image data which masks a region other than the specified region.

On the other hand, the automatic method which creates the mask image data creates the mask image data with respect to a desired frame, by carrying out the manual operation by the operator as in the case of the above manual method which creates the mask image data. Then, using the manually created mask image data, edges are detected at a periphery of the specified region of the mask image data which is created with respect to the reference image of the next frame. A region is then set by connecting the detected edges, and the mask image data which masks a region other than the set region is created.

The mask image data can be created automatically by successively applying the above described process with respect to the subsequent frames.

The mask image data which is created as described above is supplied from the mask image data supplying part 22.

The image processing part 23 includes an object judging part 25, a circumscribing rectangle calculating part 26, a cut out data output part 27, a circumscribing rectangle information output part 28, a position information calculating part 29, and a position information output part 30.

The object judging part 25 reads the reference image data from the reference image data supplying part 21 and the mask image data supplied from the mask image data supplying part 22 and corresponding to the reference image data, and extracts an image of a desired region, that is, a target object, by applying the mask image data with respect to the reference image data.

The circumscribing rectangle calculating part 26 calculates a circumscribing rectangle of the target object extracted by the object judging part 25.

The cut out data output part 27 cuts out and outputs the image data of the circumscribing rectangle calculated from the reference image data by the circumscribing rectangle calculating part 26.

The circumscribing rectangle information output part 28 obtains and outputs circumscribing rectangle information related to the size and the like of the circumscribing rectangle calculated by the circumscribing rectangle calculating part 26.

The position information calculating part 29 obtains and outputs position information of the circumscribing rectangle calculated by the circumscribing rectangle calculating part 26 in the reference image.

The data storage part 24 stores the cut out image data output from the cut out data output part 27, the circumscribing rectangle information output from the circumscribing rectangle information output part 28, and the position information output from the position information output part 30.

Next, a more detailed description will be given of the operation of the image processing part 23.

Figure 3:
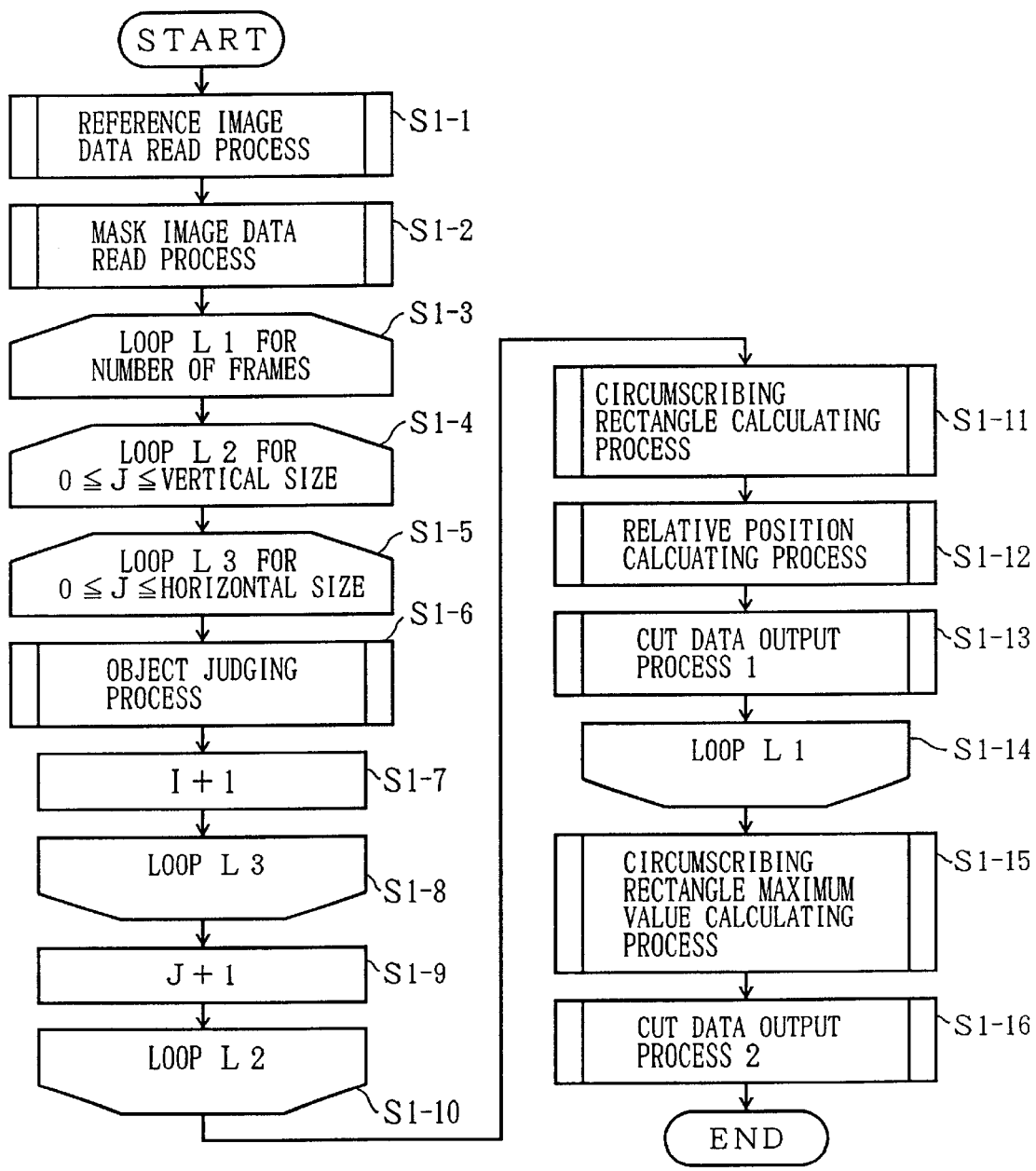
FIG. 3 is a flow chart for explaining the operation of an image processing part of the embodiment.

FIG. 3 is a flow chart for explaining the operation of the image processing part 23 of this embodiment.

The image processing part 23 first reads the reference image data from the reference image data supplying part 21 in a step S1-1. Then, the image processing part 23 reads the mask image data from the mask image data supplying part 22 in a step S1-2, where the mask image data masks a region other than the target object within the reference image data read in the step S-1.

When the reference image data and the mask image data are read by the steps S1-1 and S1-2, the image processing part 23 carries out an object judging process, a circumscribing rectangle calculating process, a relative position calculating process and a cut out data output process for each frame by carry out a loop L1, in steps S1-3 through S1-14.

In the object judging process of the step S1-6, the mask image data read from the mask image supplying part 22 in the step S1-2 is scanned 1 pixel at a time in a horizontal direction and in a vertical direction from an origin by carrying out loops L2 and L3, in steps S1-4, S1-5 and S1-7 through S1-10.

A description will now be given of the object judging process of the step S1-6.

Figure 4:
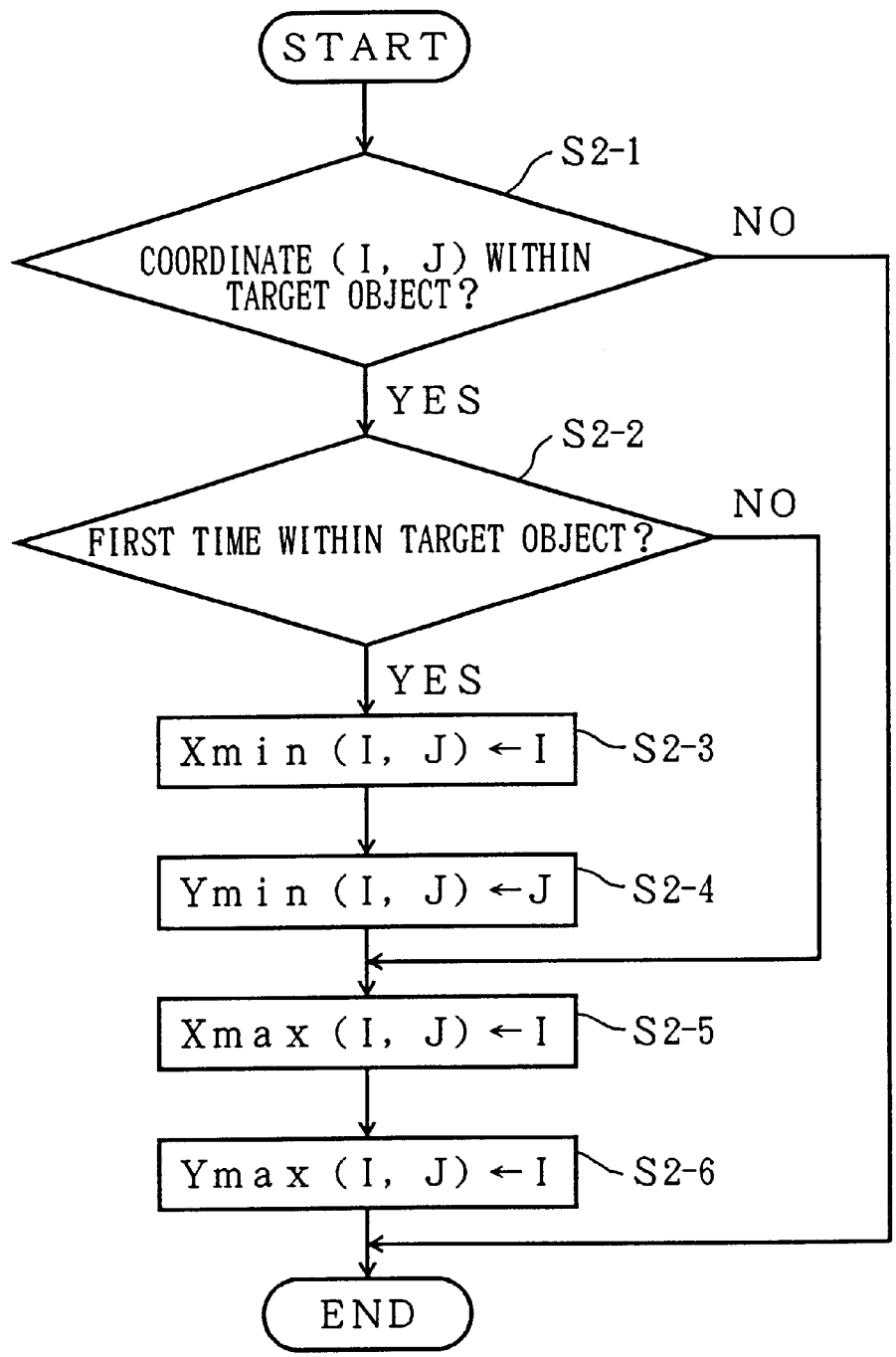
FIG. 4 is a flow chart for explaining an object judging process of the embodiment.

FIG. 4 is a flow chart for explaining the object judging process of this embodiment.

In the object judging process of the step S1-6, a step S2-1 decides whether or not a pixel at a coordinate (I, J) is inside the target object, where (I, J) denotes a coordinate of the pixel of the image. Whether or not the pixel is inside the target object can be decided by judging the pixels in a mask part other than a specified region of the mask image data as being outside the target object, and judging the pixels in the specified region as being inside the target object.

If the decision result in the step S2-1 is NO, it is judged that there is no target object, and the object judging process ends.

On the other hand, if the decision result in the step S2-1 is YES, a step S2-2 decides whether or not the pixel at the coordinate (I, J) is detected as a first pixel inside the target object.

If the decision result in the step S2-2 is YES, steps S2-3 and S2-4 set the coordinate (I, J) as a minimum external form coordinate Xmin(I, J), Ymin(I, J). In addition, steps S2-5 and S2-6 set the coordinate (I, J) to a maximum external form coordinate Xmax(I, J), Ymax(I, J).

If the decision result in the step S2-2 is NO, the steps S2-5 and S2-6 set the coordinate (I, J) to the maximum external form coordinate Xmax(I, J), Ymax(I, J).

The above described operation is repeated within 1 frame, and the coordinate of an outer edge of the target object within the frame is obtained from the minimum external form coordinate Xmin(I, J), Ymin(I, J) and the maximum external form coordinate Xmax(I, J), Ymax(I, J).

When the above described process is carried out with respect to the image amounting to 1 frame, a step S1-11 calculates the circumscribing rectangle of the target object is obtained from the minimum values Xmin(I, J), Ymin(I, J) and the maximum values Xmax(I, J), Ymax(I, J) of the pixels forming the target object obtained by the object judging process of the step S1-6.

A description will now be given of the circumscribing rectangle calculating process of the step S1-11.

Figure 5:
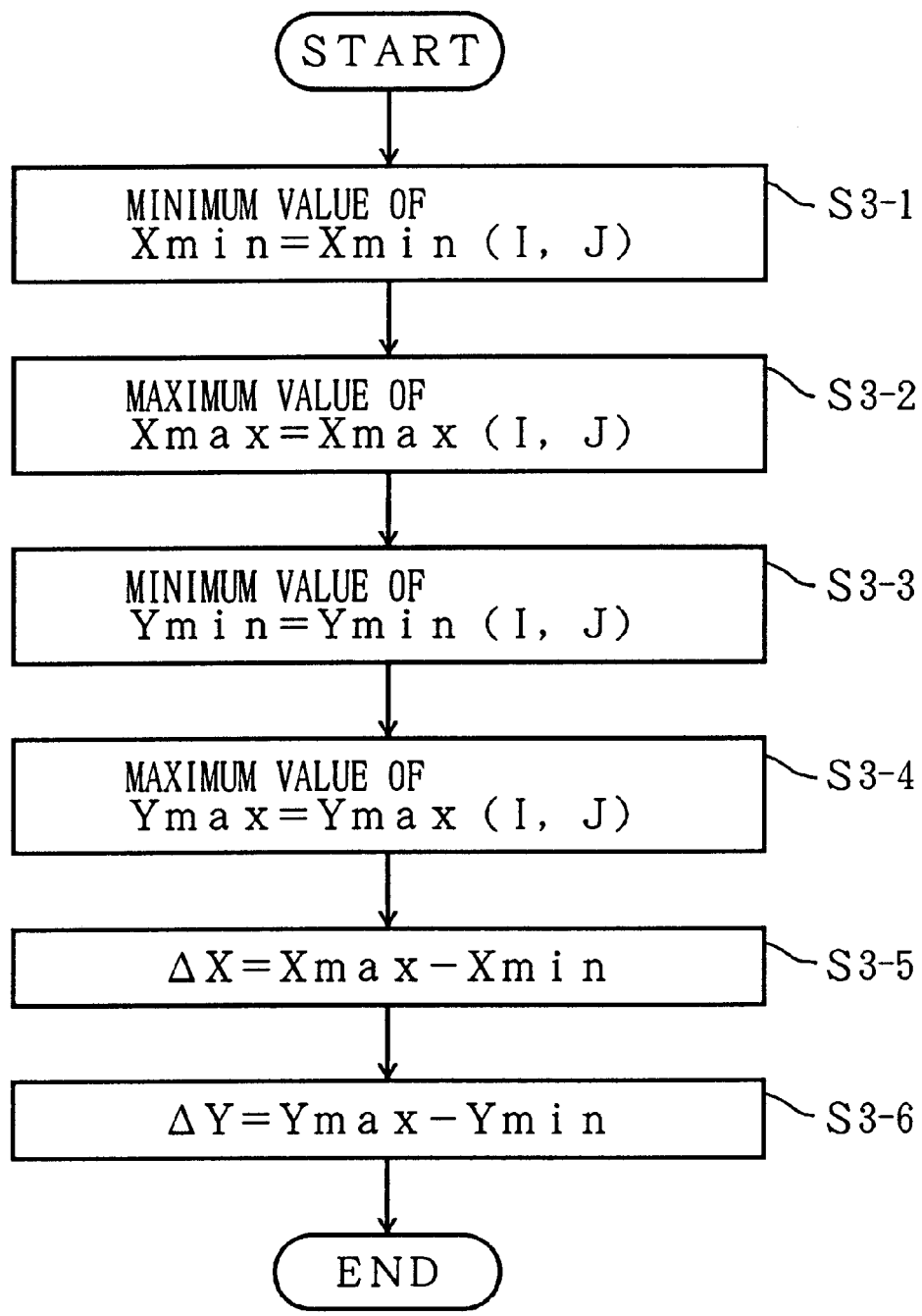
FIG. 5 is a flow chart for explaining a circumscribing rectangle calculating process of the embodiment.

FIG. 5 is a flow chart for explaining the circumscribing rectangle calculating process of the step S1-11.

The circumscribing rectangle calculating process first sets a minimum value of the minimum external form coordinate Xmin(I, J) which is obtained by the steps S1-4 through S1-10 to Xmin in a step S3-1.

In addition, a maximum value of the maximum external coordinate Xmax(I, J) which is obtained by the step S1-4 through S1-10 is set to Xmax in a step S3-2.

A minimum value of the minimum external form coordinate Ymin(I, J) which is obtained by the steps S1-4 through S1-10 to Ymin in a step S3-3.

Moreover, a maximum value of the maximum external coordinate Ymax(I, J) which is obtained by the step S1-4 through S1-10 is set to Ymax in a step S3-4.

Next, a step S3-5 obtains a size $\Delta X$ of the target object in the X-axis direction from a difference between the maximum value Xmax along the X-axis obtained in the step S3-2 and the minimum value Xmin along the X-axis obtained in the step S31.

In other words, the size $\Delta X$ of the target object in the X-axis direction can be obtained from $\Delta X = Xmax - Xmin$.

On the other hand, a step S3-6 obtains a size $\Delta Y$ of the target object in the Y-axis direction from a difference between the maximum value Ymax along the Y-axis obtained in the step S3-4 and the minimum value Ymin along the Y-axis obtained in the step S3-3.

In other words, the size $\Delta Y$ of the target object in the Y-axis direction can be obtained from $\Delta Y = Ymax - Ymin$.

The size of the circumscribing rectangle is obtained in the above described manner.

When the sizes $\Delta X$ and $\Delta Y$ of the circumscribing rectangle which circumscribes the target object are obtained by the circumscribing rectangle calculating process of the step S1-11, a position on the circumscribing rectangle in the image is obtained in a step S1-12.

A description will now be given of the relative position calculating process of the step S1-12.

Figure 6:
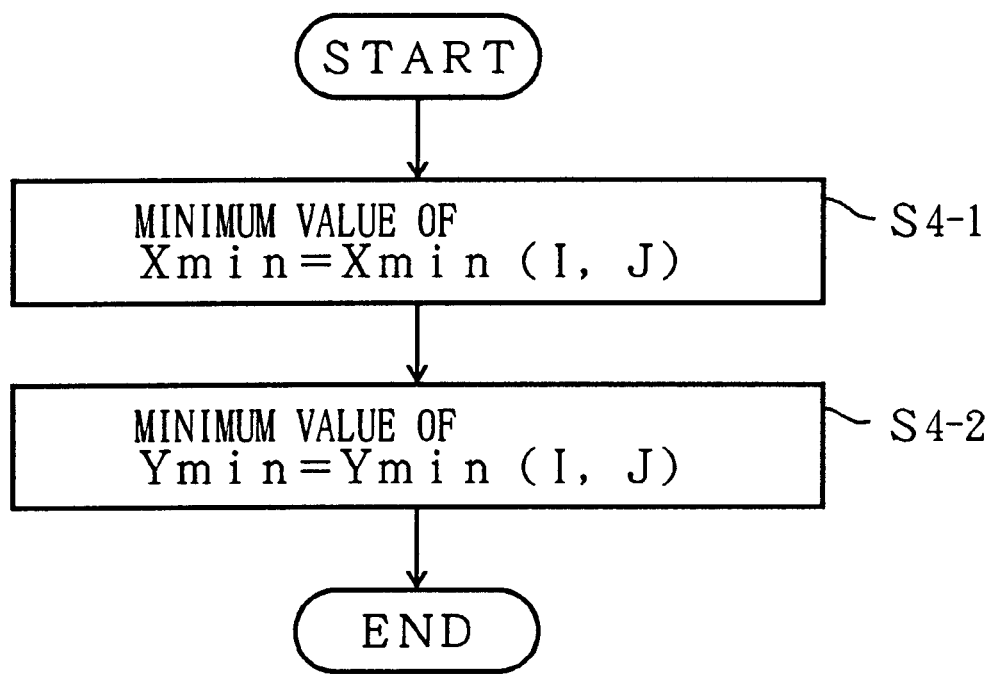
FIG. 6 is a flow chart for explaining a relative position calculating process of the embodiment.

FIG. 6 is a flow chart for explaining the relative position calculating process of this embodiment.

In the relative position calculating process, steps S4-1 and S4-2 set the coordinate (Xmin, Ymin) of the minimum value of the circumscribing rectangle obtained in the step S1-11, that is, a coordinate at a top left corner of the circumscribing rectangle in the image, as the relative position coordinate of the circumscribing rectangle.

When the relative position of the circumscribing rectangle is obtained in the step S1-12 as described above, a step S1-13 cuts out from the reference image an image within a range of the circumscribing rectangle.

A description will now be given of the cut out data output process of the step S1-13 which cuts out from the reference image the image within the range of the circumscribing rectangle and outputs the cut out image.

Figure 7:
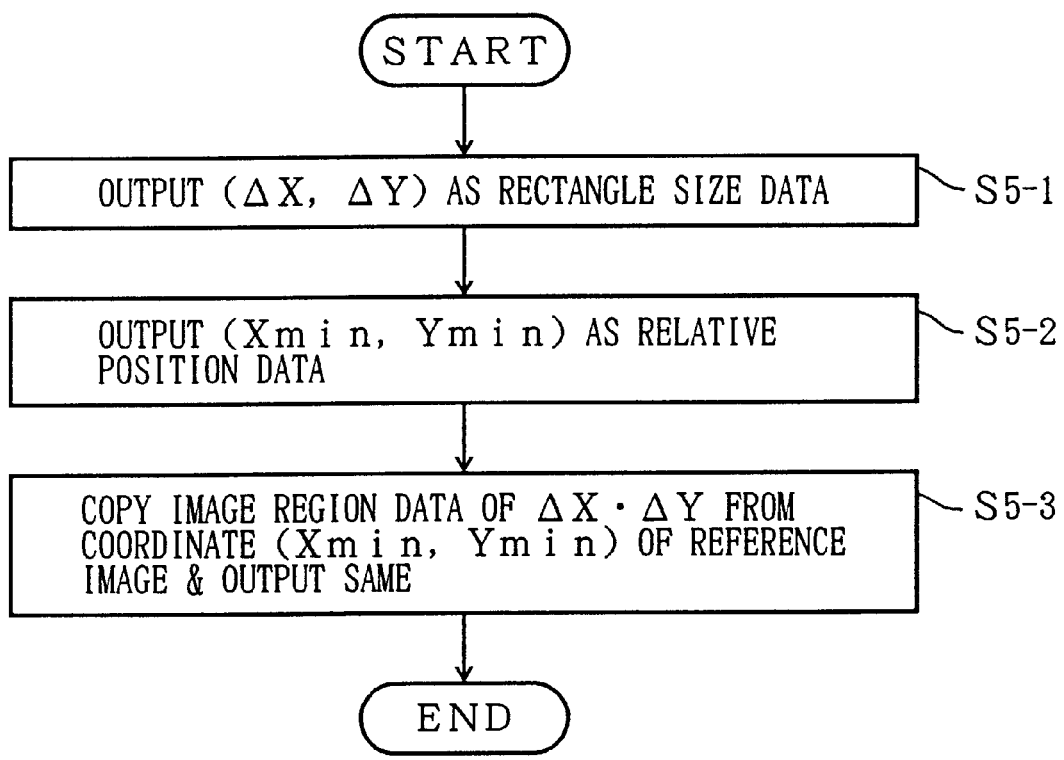
FIG. 7 is a flow chart for explaining a cut data output process of the embodiment.

FIG. 7 is a flow chart for explaining the cut out data outputting process of this embodiment.

In the cut out data output process, the size data ($\Delta X$, $\Delta Y$) of the circumscribing rectangle calculated by the circumscribing rectangle calculating process of the step S1-11 is output as a circumscribing rectangle size data in a step S5-1.

Then, a step S5-2 outputs the top left corner coordinate (Xmin, Ymin) of the circumscribing rectangle calculated in the step S1-12 as a relative position data.

A step S5-3 arranges the top left corner of the circumscribing rectangle size data ($\Delta X$, $\Delta Y$) output by the step S5-1 in the relative position data (Xmin, Ymin), in the reference image, so as to copy and output only the image data within the circumscribing rectangle.

Hence, the circumscribing rectangle size data, the relative position data, and the cut out image data are obtained by the above described process. By repeating the steps S1-3 through S1-14 by the loop L1, it is possible to obtain the circumscribing rectangle of the target object in each frame.

Therefore, the target object is cut out from the plurality of sequential images, that is, a motion picture, and is displayed by the process described above.

Next, when cutting out the target object from the plurality of sequential images using circumscribing rectangles having a single size, a circumscribing rectangle maximum value calculating process of a step S1-15 is carried out.

A description will be given of the circumscribing rectangle maximum value calculating process.

Figure 8:
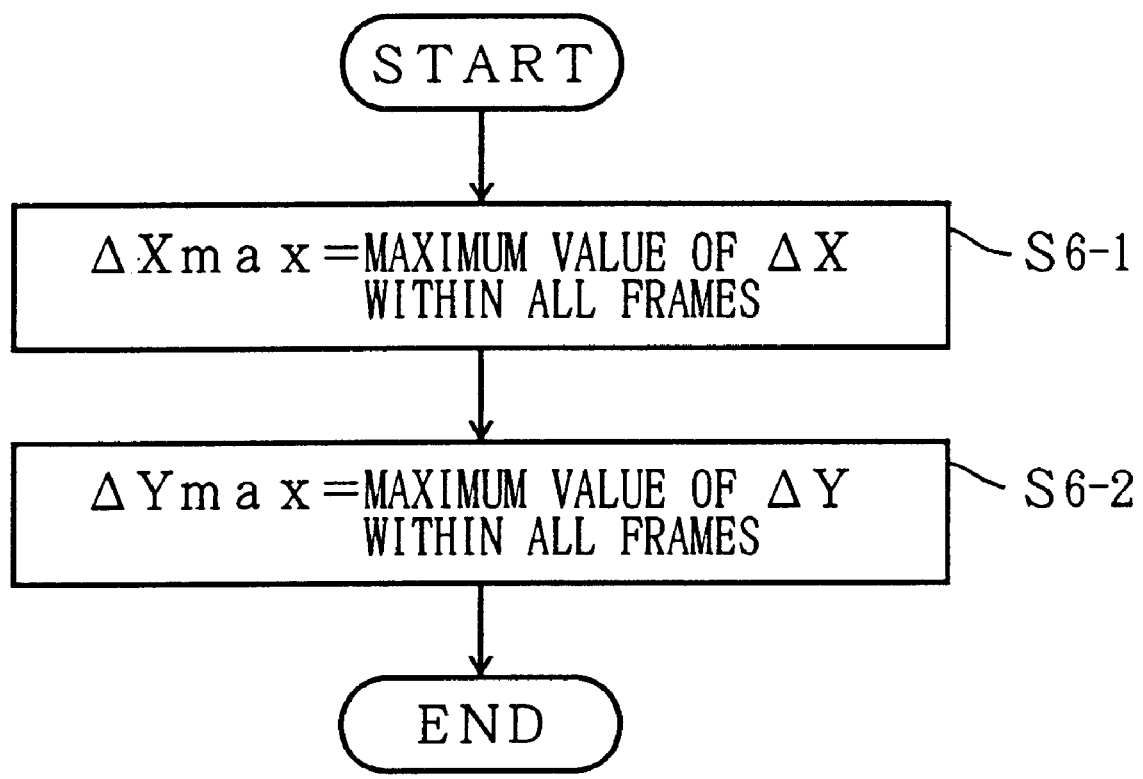
FIG. 8 is a flow chart for explaining a circumscribing rectangle maximum value calculating process of the embodiment.

FIG. 8 is a flow chart for explaining the circumscribing rectangle maximum value calculating process of this embodiment.

In the circumscribing rectangle maximum value calculating process, a step S6-1 sets a maximum value of the X-component $\Delta X$ of the circumscribing rectangle size data ($\Delta X$, $\Delta Y$) of the circumscribing rectangle set for the plurality of frames by the loop L1 to $\Delta X$max, and a step S6-2 sets a maximum value of the Y-component $\Delta Y$ of the circumscribing rectangle size data ($\Delta X$, $\Delta Y$) to $\Delta Y$max.

Accordingly, it is possible to set the circumscribing rectangle size ($\Delta X$max, $\Delta Y$max) including all of the circumscribing rectangles set for the plurality of frames.

When the circumscribing rectangle size ($\Delta X$max, $\Delta Y$max) including the circumscribing rectangles set for all of the frames is set as a result of the circumscribing rectangle maximum value calculating process of the step S1-15, a step S1-16 extracts an image from the reference image using the circumscribing rectangle of the circumscribing rectangle size ($\Delta X$max, $\Delta Y$max) set by the step S1-15, and outputs the extracted image.

A description will now be given of the cut data output process using a maximum circumscribing rectangle obtained in the step S1-16.

Figure 9:
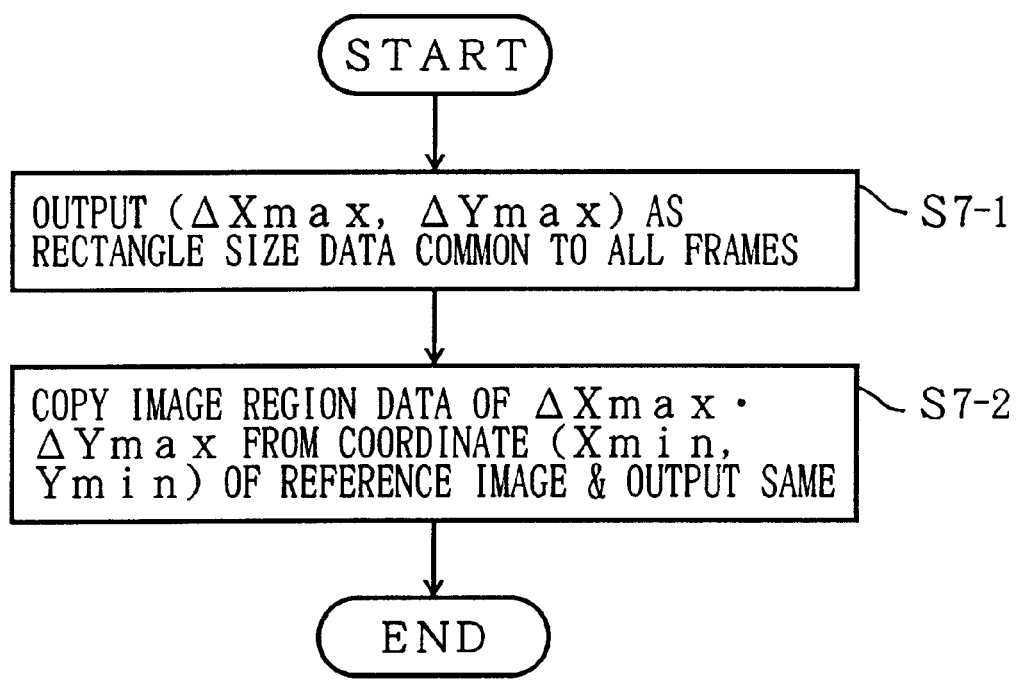
FIG. 9 is a flow chart for explaining a cut data output process using a maximum circumscribing rectangle of the embodiment.

FIG. 9 is a flow chart for explaining the cut data output process using the maximum circumscribing rectangle of this embodiment.

The cut data output process using the maximum circumscribing rectangle reads the circumscribing rectangle size ($\Delta X$max, $\Delta Y$max) set by the step S1-16, in a step S7-1. A step S7-2 sets the top left corner of the circumscribing rectangle of the circumscribing rectangle size ($\Delta X$max, $\Delta Y$max) read by the step S7-1 to the coordinate (Xmin, Ymin) of the reference image, and copies from the reference image and outputs only the image within the circumscribing rectangle.

The image processing part 23 outputs the data, including the circumscribing rectangle size, relative position and image data, by the process shown in FIG. 3.

Figures 10A, 10B:
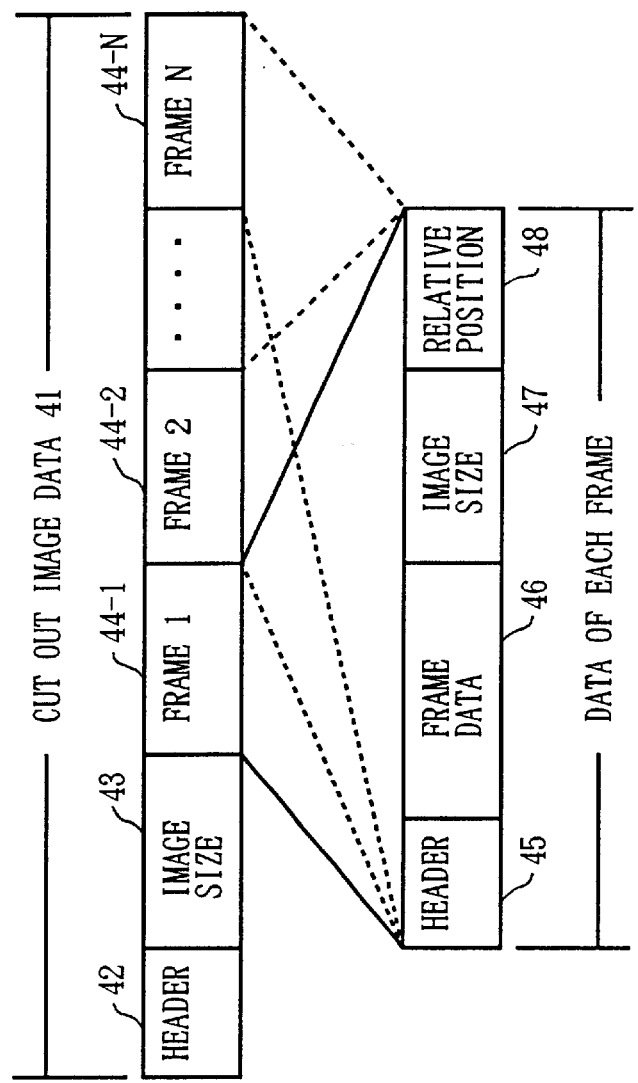
FIGS. 10A and 10B respectively are diagrams for explaining a data structure output from the image processing part of the embodiment.

FIGS. 10A and 10B respectively are diagrams for explaining a data structure of the data output by the image processing part 23 in this embodiment. FIG. 10A shows the data structure of the entire cut data, and FIG. 10B shows the data structure of each frame.

A cut data 41 is made up of a header 42, image size information 43, and frame data 44-1 through 44-N as shown in FIG. 10A.

The header 42 includes information which indicates that the data is the cut data 41. The image size information 43 indicates the size of the maximum circumscribing rectangle calculated in the step S1-15 when the process of cutting out the image using the maximum circumscribing rectangle is selected in the step S1-15. The image size information is unnecessary in a case where the circumscribing rectangle is set for each frame, since the image size information is stored in each of the frame data 44-1 through 44-N in such a case.

The frame data 44-1 through 44-N are respectively made up of a header 45, a frame data 46, image size information 47, and relative position information 48 as shown in FIG. 10B.

The header 45 includes information for identifying each frame. The frame data 46 indicates the image data within the circumscribing rectangle set for each frame.

The image size information 47 indicates the size of the circumscribing rectangle set for each frame. The relative position information 48 indicates the position of the circumscribing rectangle within each frame calculated in the step S1-12, and is unnecessary in a case where the process of cutting out the image using the maximum circumscribing rectangle is selected in the step S1-15.

Next, a description will be given of the image processing operation of this embodiment.

FIGS. 11A, 11B, 11C and 11D respectively are diagrams for explaining the image processing operation of this embodiment. FIG. 11A shows a reference image data, FIG. 11B shows a mask image data, FIG. 11C is a diagram for explaining the operation when setting the circumscribing rectangle, and FIG. 11D shows a cut data.

In the circumscribing rectangle calculating process of the step S1-6, the mask image data shown in FIG. 11B is successively scanned in units of pixels to determine whether the pixel is inside or outside the target object, so that the coordinates Xmin(I, J), Xmax(I, J), Ymin(I, J), Ymax(I, J) of the edges of the target object are obtained as shown in FIG. 11C.

In the circumscribing rectangle calculating process of the step S1-11, a circumscribing rectangle 51 is obtained from the minimum values Xmin, Ymin and the maximum values Xmax, Ymax of the coordinates Xmin(I, J), Xmax(I, J), Ymin(I, J), Ymax(I, J) of the edges of the target object obtained in the step S1-6 shown in FIG. 11C. In addition, the size ΔX, ΔY of the circumscribing rectangle is obtained from the minimum values Xmin, Ymin and the maximum values Xmax, Ymax.

Then, the image of the region within the circumscribing rectangle 51 is cut out from the reference image data shown in FIG. 11A, so as to obtain the cut data shown in FIG. 11D.

In this state, it is possible to select a case where the circumscribing rectangles set for each of the frames in the step S1-13 are output as they are, and a case where a common circumscribing rectangle is used for a plurality of frames.

Figure 12A:
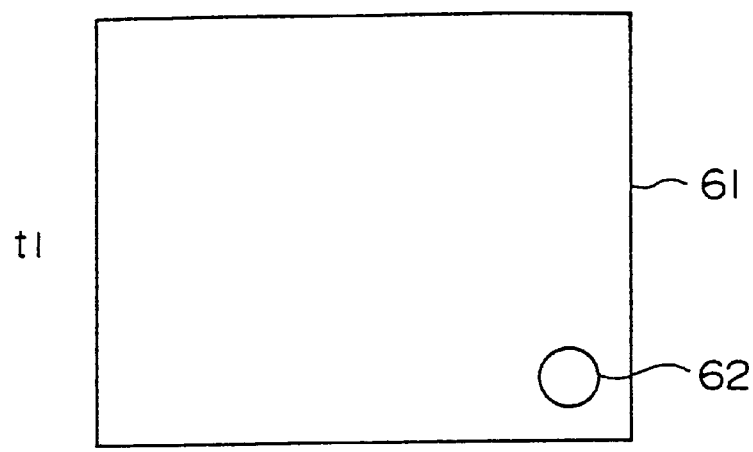
FIGS. 12A, 12B and 12C respectively are diagrams for explaining a case where the size of the target object changes in the embodiment.
Figure 12B:
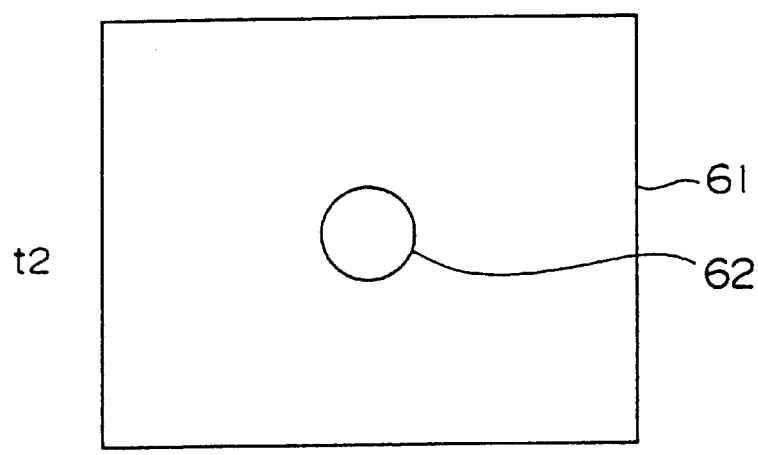
Figure 12C:
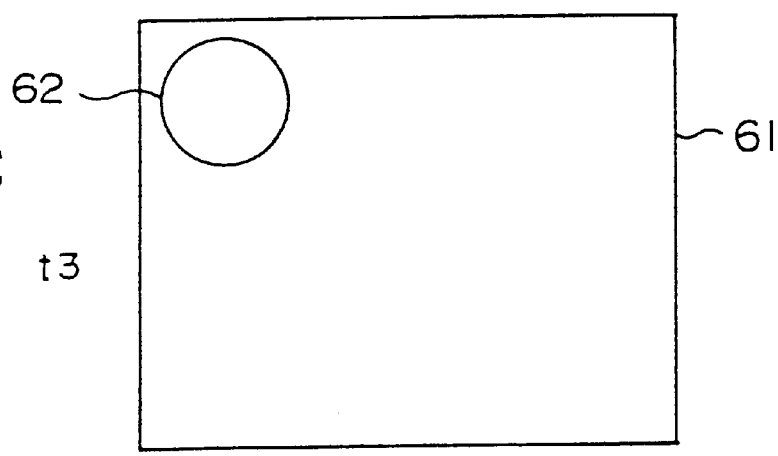

FIGS. 12A, 12B and 12C respectively are diagrams for explaining a case where the size of the target object changes in this embodiment. FIG. 12A shows a picture at a time t1, FIG. 12B shows a picture at a time t2, and FIG. 12C shows a picture at a time t3.

As shown in FIGS. 12A through 12C, it is assumed for the sake of convenience that object 62 located at a bottom right corner of a picture 61 moves to a top left corner while gradually increasing in size as the time elapses from the time t1 to the time t3.

In this state, a description will first be given of a case where the circumscribing rectangle is set for each frame in the step S1-13.

Figures 13A, 13B, 13C:
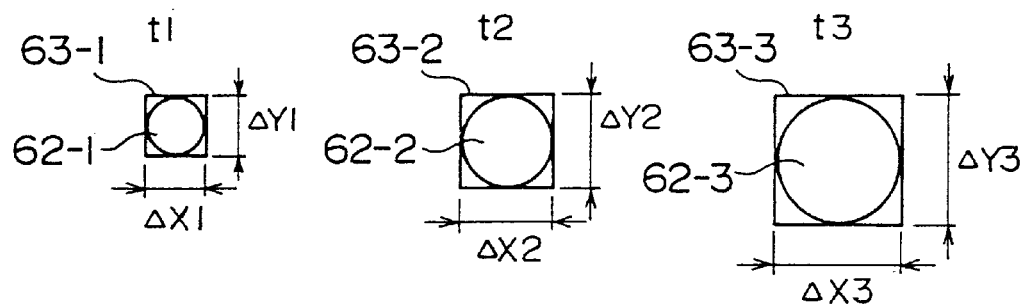
FIGS. 13A, 13B and 13C respectively are diagrams for explaining an operation of setting the circumscribing rectangle for each frame in the embodiment.

FIGS. 13A, 13B and 13C respectively are diagrams for explaining the operation of setting the circumscribing rectangle for each frame in this embodiment. FIG. 13A shows a circumscribing rectangle at the time t1, FIG. 13B shows a circumscribing rectangle at the time t2, and FIG. 13C shows a circumscribing rectangle at the time t3.

At the time t1, a circumscribing rectangle 63-1 having a size (ΔX1, ΔY1) circumscribing an object 62-1 as shown in FIG. 13A is set. At the time t2, a circumscribing rectangle 63-2 having a size (ΔX2, ΔY2) circumscribing an object 62-2 as shown in FIG. 13B is set. At the time t3, a circumscribing rectangle 63-3 having a size (ΔX3, ΔY3) circumscribing an object 62-3 as shown in FIG. 13C is set.

Accordingly, it is possible to set the circumscribing rectangles corresponding to the objects 62-1 through 62-3 by setting the circumscribing rectangle for each frame.

Next, a description will be given of the operation of cutting out the objects of a plurality of frames using a common circumscribing rectangle in the step S1-15.

Figures 14A, 14B, 14C:
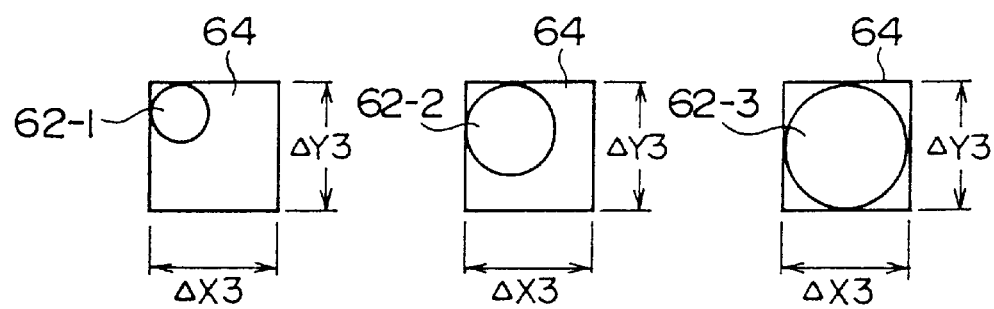
FIGS. 14A, 14B and 14C respectively are diagrams for explaining an operation in a case where a common circumscribing rectangle is used for a plurality of frames in the embodiment.

FIGS. 14A, 14B and 14C respectively are diagrams for explaining the operation in a case where a common circumscribing rectangle is used for a plurality of frames in this embodiment. FIG. 14A shows a circumscribing rectangle at the time t1, FIG. 14B shows the circumscribing rectangle at the time t2, and FIG. 14C shows the circumscribing rectangle at the time t3.

In the step S1-15, of the circumscribing rectangles 63-1 through 63-3 which are set as shown in FIGS. 13A through 13C, the step S1-15 sets the circumscribing rectangle 63-3 which includes the objects 62-1 through 62-3 of all of the frames as a common circumscribing rectangle 64 which is common to all of the frames.

In this state, the common circumscribing rectangle 64 is large compared to the object 62-1 at the time t1 and the object 62-2 at the time t2, and the objects 62-1 and 62-2 are not positioned within the common circumscribing rectangle 64. Accordingly, the objects 62-1 and 62-2 are arranged by using the top left corner of the common circumscribing rectangle 64 as a reference position.

The sequential rectangular images which are cut out are composed with another image and output. This composing of the images is carried out in the CPU 2, and known image composing techniques may be employed.

It is possible to compose the sequential rectangular images with the other image depending on the position information. By composing the sequential rectangular images with the other image depending on the position information, the motion within the reference image can be reproduced accurately in the cut out image when composing the images using the chroma key technique or the like, and it is possible to reproduced a realistic image.

Therefore, by using the common circumscribing rectangle for a plurality of frames, it becomes sufficient to set the image size information of one circumscribing rectangle with respect to a plurality of frames in the data structure shown in FIGS. 10A and 10B. For this reason, it is sufficient to set only the image size information 43 shown in FIG. 10A, and the image size information 47 for each frame shown in FIG. 10B is unnecessary, thereby making it possible to reduce the data size.

It is assumed in the embodiment described above that the reference image data and the mask image data are AVI format video data and that the cut out image data are MPEG system video data. However, the reference image data, the mask image date and the cut out image data are not limited to the above, and it is possible to employ other video formats such as the Quick Time system.

In addition, although the embodiment described above uses a general purpose information processing apparatus such as the personal computer as the image processing apparatus, it is of course possible to form the image processing apparatus by a microcomputer or the like designed exclusively for the image processing.

According to the present invention, the rectangle including the target image and not the entire picture is cut out, so that the target object can be cut out by processing a small amount of data.

In addition, according to the present invention, since target object is cut out as the minimum rectangle which circumscribes the target object, the object can be cut out by processing a minimum amount of data.

Furthermore, according to the present invention, the rectangle including the target image and not the entire picture is cut out when cutting out the target object from a plurality of sequential images such as a motion picture. As a result, it is possible to cut out the target object by processing a small amount of data.

Moreover, according to the present invention, it is possible to recognize the size of the rectangle by adding image size information which indicates the size of the rectangle.

In addition, according to the present invention, it is possible to recognize the position of the cut out rectangular image within the image by adding the position information, and to paste an image to the same position as an original image.

Moreover, by composing the cut out sequential rectangular images and another image depending on the position information, the present invention can accurately reproduce the motion of the cut out image within a reference image when composing the images using the chroma key technique or the like, thereby making it possible to reproduce realistic images.

Further, the present invention is not limited to these embodiments, but various variations and modifications may be made without departing from the scope of the present invention.

What is claimed is:

1. An image processing apparatus for extracting a desired target object from a plurality of sequential images that include the target object, comprising:
   a target object identification part identifying the target object from a plurality of sequential images;
   a rectangle extracting part extracting rectangles which include the target object identified by said target object identification part;
   an image cutting part cutting out a plurality of rectangular images including the target object from the rectangles extracted from the plurality of sequential images by said rectangle extracting part; and
   a storage part storing image data of the plurality of rectangular images, including image data of the target object, cut by said image cutting part.

2. The image processing apparatus as claimed in claim 1, wherein said rectangle extracting part extracts minimum rectangles which circumscribe the target object.

3. The image processing apparatus as claimed in claim 1, wherein said image cutting part cuts out a plurality of rectangular images which include the target object from the plurality of sequential images by one of the rectangles having a maximum size.

4. The image processing apparatus as claimed in claim 1, wherein said image cutting part outputs image size information of the plurality of rectangular images.

5. The image processing apparatus as claimed in claim 1, wherein the plurality of sequential images are described by vector data.

6. The image processing apparatus as claimed in claim 1, wherein the plurality of sequential images are described by bit map data.

7. The image processing apparatus as claimed in claim 1, further comprising:
   a composing part composing the plurality of sequential rectangular images which are cut out and another image, and outputting sequential composed images.

8. The image processing apparatus as claimed in claim 1, further comprising:
   a composing part composing the plurality of sequential rectangular images which are cut out and another image depending on the position information.

9. An image processing apparatus for extracting a desired target object from a plurality of sequential images that include the target object, comprising:
   target object identification means for identifying the target object from a plurality of sequential images;
   rectangle extracting means for extracting rectangles which include the target object identified by said target object identification means;
   image cutting means for cutting out a plurality of rectangular images including the target object from the rectangles extracted from the plurality of sequential images by said rectangle extracting means; and
   storage means for storing image data of the plurality of rectangular images, including image data of the target object, cut by said image cutting means.

10. A computer-readable recording medium which stores a program for causing a computer to carry out:
    a target object identification procedure identifying a target object from a plurality of sequential images;
    a rectangle extracting procedure extracting rectangles which include the target object identified by said target object identification procedure;
    an image cutting procedure cutting out a plurality of rectangular images including the target object from the rectangles extracted from the plurality of sequential images by said rectangle extracting procedure; and
    a storage procedure storing image data of the plurality of rectangular images, including image data of the target object, cut by said image cutting procedure.

11. The computer-readable recording medium as claimed in claim 10, wherein said rectangle extracting procedure extracts minimum rectangles that circumscribe the target object.

12. The computer-readable recording medium as claimed in claim 10, wherein said image cutting procedure cuts out a plurality of rectangular images which include the target object from the plurality of sequential images by one of the rectangles having a maximum size.

13. The computer-readable recording medium as claimed in claim 10, wherein said image cutting procedure outputs image size information of the plurality of rectangular images.

14. The computer-readable recording medium as claimed in claim 10, wherein said program further causes the computer to carry out:
    a procedure composing the plurality of sequential rectangular images which are cut out and another image, and outputting sequential composed images.

15. The computer-readable recording medium as claimed in claim 11, wherein said program further causes the computer to carry out:
    a procedure composing the plurality of sequential rectangular images which are cut out and another image depending on the position information.

16. An image processing method for extracting a desired target object from a plurality of sequential images that include the target object, comprising:
    a target object identification operation identifying a target object from a plurality of sequential images that include the target object;
    a rectangle extracting operation extracting rectangles which include the target object identified by said target object identification operation;
    an image cutting operation cutting out a plurality of rectangular images including the target object from the rectangles extracted from the plurality of sequential images by said rectangle extracting operation; and
    a storage operation storing image data of the plurality of rectangular images, including image data of the target object, cut by said image cutting operation.

17. The image processing method as claimed in claim 16, wherein said rectangle extracting operation extracts minimum rectangles that circumscribe the target object.

18. The image processing method as claimed in claim 16, wherein said image cutting operation cuts out a plurality of rectangular images which include the target object from the plurality of sequential images by one of the rectangles having a maximum size.

19. The image processing method as claimed in claim 16, wherein said image cutting operation outputs image size information of the plurality of rectangular images.

* * * * *

UNITED STATES PATENT AND TRADEMARK OFFICE
CERTIFICATE OF CORRECTION

PATENT NO. : 6,879,704 B2
DATED : April 12, 2005
INVENTOR(S) : Yasufumi Nakamura et al.

It is certified that error appears in the above-identified patent and that said Letters Patent is hereby corrected as shown below:

Column 11,
Line 17, after "part" insert -- and outputting image data and position information of the plurality of rectangular images within the plurality of sequence images --.
Line 18, after "data" insert -- and the position information --.
Line 59, after "means" insert -- and outputting image data and position information of the plurality of rectangular images within the plurality of sequence images --.
Line 60, after "data" insert -- and the position information --.

Column 12,
Lines 36-51, delete in their entirety and replace with the following:
-- 16.  An image processing method for extracting a desired target object from a plurality of sequential images that include the target object, comprising the steps of:
    identifying a target object from a plurality of sequential images that include the target object;
    extracting rectangles which include the target object identified by said target object identification step;
    cutting out a plurality of rectangular images including the target object from the rectangles extracted from the plurality of sequential images by said rectangle extracting step, and outputting image data and position information of the plurality of rectangular images within the plurality of sequential images; and
    storing the image data and the position information of the plurality of rectangular images, including image data of the target object, cut by said image cutting step. --.
Lines 53, 56 and 61, replace "operation" with -- step --.

Signed and Sealed this

Twenty-eighth Day of February, 2006

JON W. DUDAS
*Director of the United States Patent and Trademark Office*